Sept. 15, 1925.
N. P. SJOBRING ET AL
1,553,727
ELECTRIC WELDING MACHINE
Filed Oct. 21, 1921    2 Sheets-Sheet 1
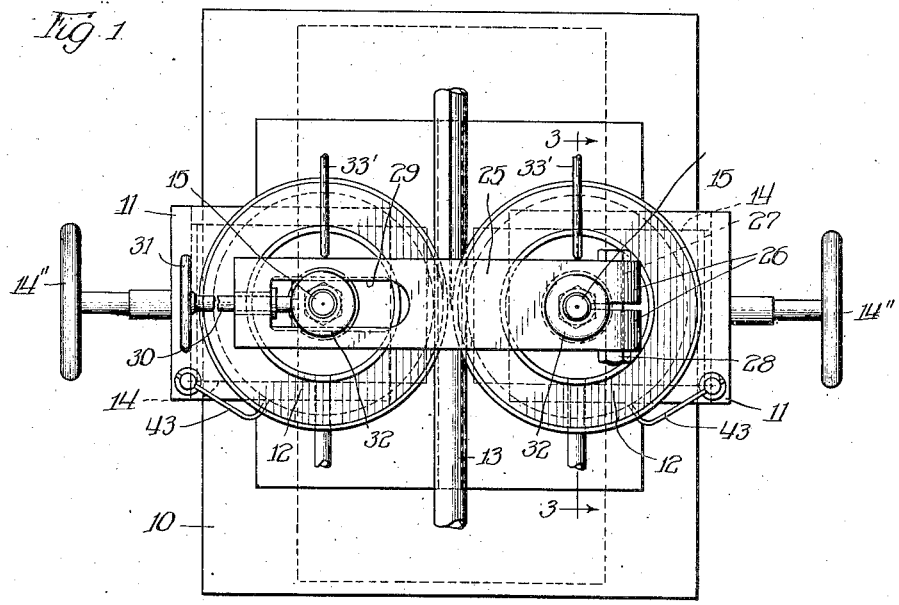
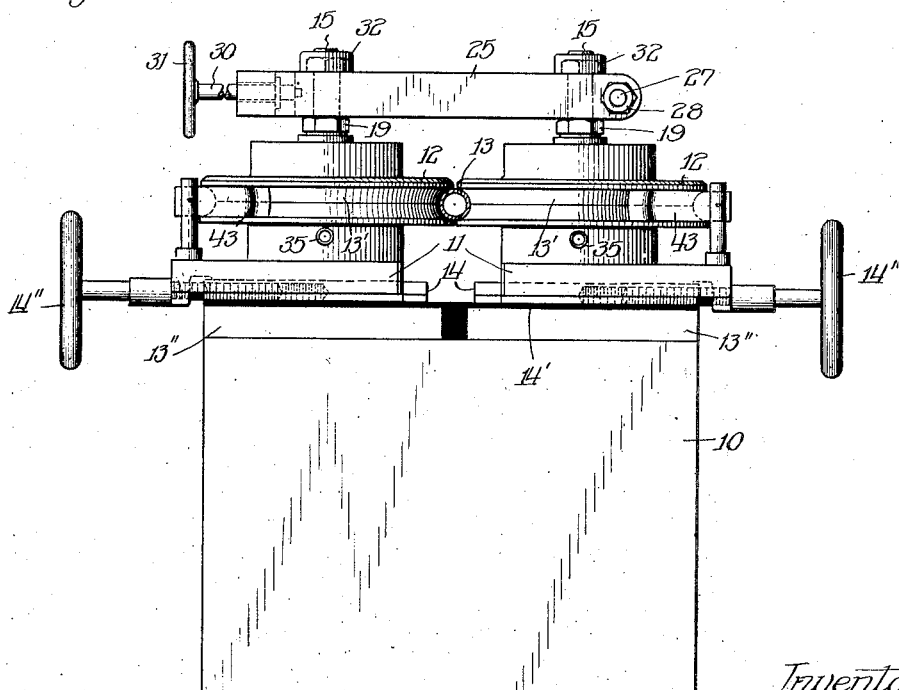
Witness:
R. Burkhardt
Inventors:
Nels P. Sjobring and
Martin Swanson,
By Wilkinson Huxley Byron Knight
atty.

Sept. 15, 1925.
N. P. SJOBRING ET AL
ELECTRIC WELDING MACHINE
Filed Oct. 21, 1921
1,553,727
2 Sheets-Sheet 2
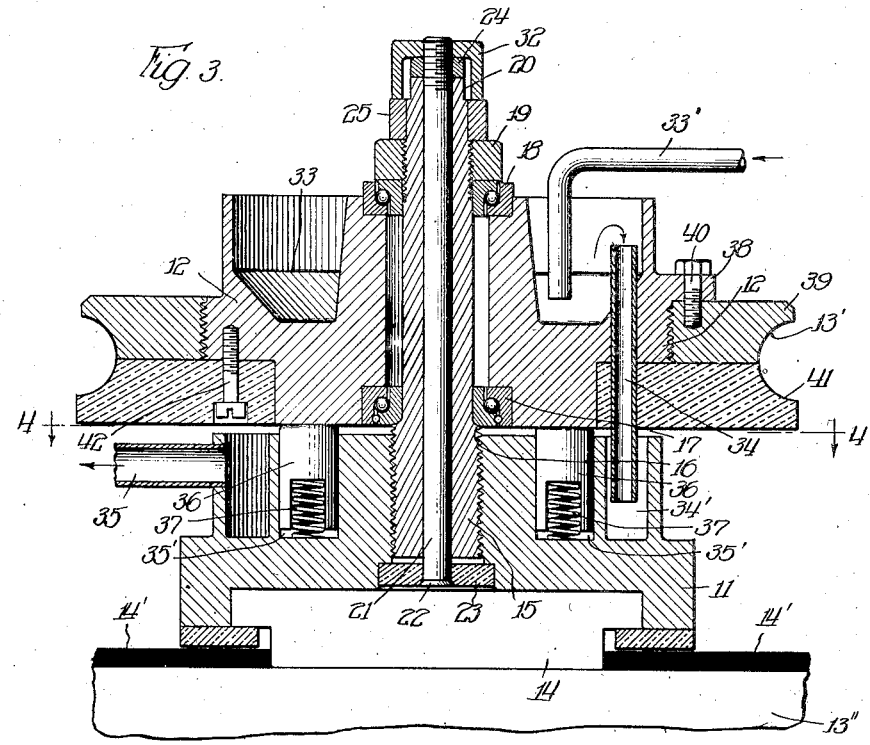
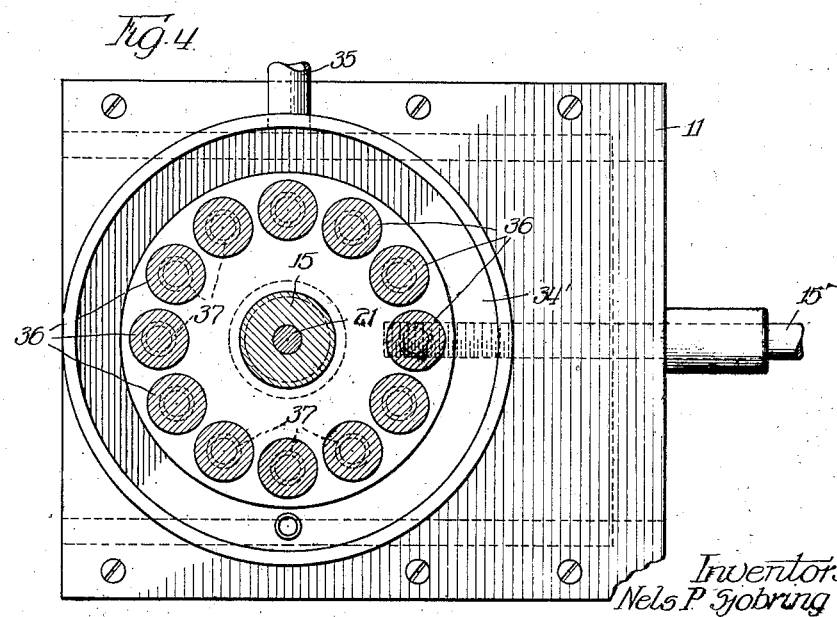
Witness:
R. Burkhardt.
Inventors:
Nels P. Sjobring
Martin Swanson,
By Wilkinson Huxley Byron + Knight
attys.

Patented Sept. 15, 1925.

1,553,727

UNITED STATES PATENT OFFICE.

NELS P. SJOBRING AND MARTIN SWANSON, OF CHICAGO, ILLINOIS, ASSIGNORS, BY MESNE ASSIGNMENTS, TO GLOBE STEEL TUBES CO., OF MILWAUKEE, WISCONSIN, A CORPORATION OF DELAWARE.

ELECTRIC WELDING MACHINE.

Application filed October 21, 1921. Serial No. 509,252.

*To all whom it may concern:*

Be it known that we, NELS P. SJOBRING and MARTIN SWANSON, citizens of the United States, residing at Chicago, in the county of Cook and State of Illinois, have invented certain new and useful Improvements in Electric Welding Machines, of which the following is a specification.

The present invention relates to electric welding machines.

More particularly, the present invention relates to welding machines which are continuous in operation and is illustrated in connection with a machine for welding tubing.

An object of the present invention is to provide a welding machine which will operate rapidly and produce uniform results.

A further object is to provide a welding machine involving rotatable parts in which the heavy current required for welding purposes is conducted to or from said rotatable parts through a short path of minimum resistance.

A further object is to provide a welding machine of sturdy construction which is simple in operation and which may be readily disassembled and assembled whenever repairs are necessary.

A further object is to provide a welding machine for welding tubing which will hold the tubing in proper shape during the welding operation and which is readily adaptable for the welding of tubing of different sizes.

Further objects will appear as the description proceeds.

Referring to the drawings, Figure 1 is a plan view of a welding machine according to the present invention;

Figure 2 is a view in elevation of the structure shown in Figure 1;

Figure 3 is a sectional view, taken along the line 3—3 of Figure 1, illustrating certain principles of the invention;

Figure 4 is a plan view along the line 4—4 of Figure 3, illustrating certain details of the invention.

The numeral 10 indicates a base member upon which are slidably mounted a pair of supports 11—11, which provide means for rotatably mounting a pair of welding rollers 12—12. Said rollers are grooved for the reception of the tubing to be welded which is indicated by the numeral 13. The groove in each of the rollers is indicated by the numeral 13'. The base member 10 may be the casing of a transformer, the leads from the secondary of said transformer being indicated by the numerals 13″—13″. For the purpose of providing a slidable mounting for the supports 11—11, there may be provided a pair of bearing members 14—14, with which the roller supports 11—11 have sliding engagement. Said bearing members 14—14 constitute electrical conducting means between each lead 13″ and its corresponding support 11. A pair of insulating members 14' may be provided for insulating leads 13″—13″ from one another and to minimize the danger of accidental short circuits across said leads.

Hand wheels 14″—14″ may be provided for adjusting the supports 11—11 relative to one another, whereby to vary the distance between the axes of the rollers 12—12. Preferably the axes of rollers 12—12 will be parallel to one another at all times, though it will be understood that this parallel relation is not essential in carrying out the present invention.

Each of the supports 11—11 has a spindle 15 screw-threaded therein. Said spindle has a shouldered portion 16 upon which is mounted a ball bearing 17. The roller 12 is mounted between the ball bearing 17 and another ball bearing co-operating therewith, indicated by the numeral 18. Said ball bearings 17 and 18 are held in proper relation to one another by means of the nut 19, which has engagement with a screw-threaded portion of the spindle 15. The spindle 15 is provided with a pair of flat sides, indicated by the numeral 20, whereby said spindle may be readily grasped by means of a wrench and turned in the support 11. By turning the spindle 15, the roller 12 mounted upon said spindle may be adjusted vertically as desired. Mounted within the spindle 15 is the rod 21, provided with a head portion 22. Mounted upon the rod 21 at the lower end thereof and held in place by the head 22 is the collar 23, having engagement with the support 11 to limit movement of the rod 21 in a vertical direction. At the other end of the rod 21 is a nut 24 having screw-threaded engagement with said rod 21. Tightening down upon the nut 24 has the effect of holding the spindle 15 in adjusted position relative to support 11.

Mounted above the nuts 19—19 on the spindles 15—15 is the connecting strut 25. Details of strut 25 do not form part of the present invention. However, a preferred form of strut has been illustrated, which is bifurcated at one end as indicated by the numerals 26—26. Said bifurcations 26—26 provide, between them, a cylindrical hole for receiving one of the spindles 15. Bolt 27 and nut 28 may be provided for holding said strut tightly to the corresponding spindle 15. The other end of the strut as illustrated, is provided with an elongated slot 29 for receiving the other spindle 15. A screw-threaded shaft 30 provided with a hand wheel 31, serves to hold the left hand spindle (as viewed in Figure 1), against movement toward the left. Inasmuch as pressure exerted against the tube to be welded will tend to separate the spindles, the construction illustrated will be effective in maintaining the spindles in parallel relation. The strut 25 is held in place by means of a pair of cup-shaped nuts 32—32, which have screw-threaded engagement with the upper extremities of rods 21—21.

Each one of the rollers 12—12 may be provided with an annular trough 33, for the reception of water or other cooling medium. Said medium is led to the trough 33 by means of the pipe 33' and is discharged from said trough by means of the overflow pipe 34. Each of the supporting members 11 may be provided with an annular trough 34' which may receive the cooling medium from the overflow pipe 34, said medium being discharged from said trough 34' by means of the overflow pipe 35.

In view of the fact, that the welding operation requires current of relatively high value at relatively low voltage, it is necessary that minimum of resistance be interposed in the path of the current used in the welding operation. For the purpose of holding this resistance down to a minimum, the present invention contemplates the novel means illustrated in Figures 3 and 4 for conducting current between the supports 11—11 and rollers 12—12. Each of the supports 11 is provided with a plurality of circumferentially placed holes 35'—35'. Closely fitting within each of the holes 35'—35' is a plunger 36 pressed upwardly by means of the spring 37 against the under side of roller 12. The material of which plungers 36 is composed should be a good electrical conductor and should be chosen as one which will present a minimum of friction when in rubbing contact with roller 12, which will preferably be composed of copper or other good electrical conductor. Graphite or metite may be used for the plungers 36—36. Said plungers 36—36 may fit very closely within the holes 35' 35' in as much as there will be practically no movement of said plungers 36—36 during the operation of the welding machine. It is only necessary that the springs 37—37 be permitted to urge the plungers 36—36 against the rollers 12—12. By means of this construction, a short path of very low resistance is provided between each of the supports 11 and its corresponding roller 12.

As best illustrated in Figure 3, the peripheral portion of each of the rollers 11 is constructed so as to be removable from the remainder of the roller. The body portion of each of the rollers 12 may be provided with a plurality of circumferentially spaced lugs 38, of which only one is illustrated. Said lugs 38 form an abutment for an annular member 39 which constitutes the upper flange of each roller 12. The annular member 39 may be screw-threaded to the body portion of the roller 12 to provide intimate electrical contact therewith and may be held in place by means of screws 40 engaging with lugs 38. Said annular member 39 should be of conducting material, preferably copper. Mounted upon the under side of the body portion of each of the rollers 12, is the annular member 41, which may be held in place by a plurality of circumferentially spaced bolts 42, of which only one is illustrated. The annular member 41 constitutes the lower flange of each of the rollers 12 and should preferably be composed of non-conducting material, such, for instance, as stone or slate. The two annular members 39 and 41 are in close engagement with one another and provide a smooth grooved peripheral portion for the roller 12. Preferably the radial distance from the periphery of member 41 to the axis of the roller 12, should be greater than the corresponding distance from the periphery of member 39 to the axis of the roller 12.

Each of the rollers 12 may be provided with one or more scrapers 43, which will be shaped to fit within the grooves 13'—13' of rollers 12—12. Said scrapers 43—43 will yieldingly engage the peripheral grooves of the rollers 12—12 and will scrape off any dirt or other foreign material which may collect in said grooves. Said scrapers 43—43 may be mounted upon the supports 11—11.

The mode of operation of the above described embodiment of the present invention will be understood from the description and from the drawings. It may be briefly stated however, that the annular members 39 and 41 will be chosen to conform to the size of the tubing which is to be welded. The tubing will be fed to the machine between the two rollers 12—12, proper adjustment of said rollers relative to one another being had by turning the hand wheels 14'—14'. When said rollers are properly adjusted relative to one another, they will be held in this position by means of the strut 25 which is adjustable by means of hand wheel 31. Any vertical adjustment of either of the rollers 12—12 which is desired may be accomplished by turning the spindle 15, said spindle being adapted to be grasped at the flattened portion 20. After having been adjusted, the spindle may be held in adjusted position by turning down the nut 24. Electrical connection is had between each of the supports 11 and its corresponding roller, by means of the plurality of plungers 36—36, which have very intimate contact with both of said members, whereby to provide a short electrical path of very low resistance between said members.

The grooved rollers 12—12 provide supporting means for the tubing to be welded throughout a greater portion of the periphery of said tubing. The fact that only the upper flange of each of the rollers is of conducting material, produces the result that the welding current is localized at these upper flanges. The tubing will be so fed to the machine that the seam in said tubing will come between these conducting flanges. Actual commercial operation shows that the heat will be localized in a region very close to the seam in said tubing, whereby a very strong weld is provided. The fact, that the tubing is held throughout almost all of its periphery, prevents distortion and produces uniformity of results. Furthermore, the fact that the non-conducting annular members 41—41 have greater diameters than the conducting annular members 39—39, produces the result that the conducting annular members 39—39 are held against contact with one another, whereby to provide against accidental short circuiting between the rollers 12—12.

What we claim as new and desire to secure by Letters Patent in the United States, is:

1. In welding apparatus, a welding roller having a peripheral groove providing a pair of peripheral flanges, one of said flanges being composed of a substance which is a conductor of electricity, the other of said flanges being composed of non-conducting material.

2. In welding apparatus, in combination, a pair of welding rollers having their axes in substantially parallel relation, said rollers having peripheral grooves for receiving a tube to be welded, adjacent parts of said rollers being composed of conducting material, adjacent parts of said rollers, disposed axially of said first mentioned parts, being composed of non-conducting material.

3. In welding apparatus, a welding roller of conducting material, means for rotatably mounting same, a base member of conducting material and conducting members in slidable contacting relation with said base member resiliently urged in a direction parallel with the axis of said roller into contact with said roller whereby to provide a low resistance path from said base member to said roller.

4. In welding apparatus, in combination, a pair of welding rollers adapted to receive between them a tube to be welded, means for adjusting the position of each of said rollers axially independently of the other roller, means located on one side of said rollers for adjusting said rollers toward or away from one another and adjustable supporting means on the other side of said rollers for holding said rollers at a predetermined distance from one another.

5. In welding apparatus, in combination, a pair of rotatable welding rollers, each having a composite structure, each of said rollers being grooved on its periphery, said rollers being arranged with their axes parallel and with their grooves juxtaposed, the upper portion adjacent the groove in each of said rollers being composed of conducting material, the lower portion thereof being composed of non-conducting material.

6. In welding apparatus, in combination, a rotatable welding roller, a base member of conducting material and conducting members in said base member in slidable contacting relation with said base member resiliently pressed into contact with said roller, whereby to provide a low resistance path from said base member to said roller.

7. In welding apparatus, a roller of conducting material, said roller having a non-conducting ring, and a removable operating ring, said rings having contiguous peripheral presentations for contacting with the material to be welded.

8. In tube welding apparatus, a pair of rotary rollers adapted to transmit current to or from a member to be welded, said rollers being formed with grooves on their peripheries fitting the member to be welded, said roller including a removable conducting ring and a non-conducting holding ring for contacting with the member to be welded.

9. In welding apparatus, in combination, a pair of grooved welding rollers having their axes substantially parallel, means for adjusting each of said rollers axially, means mounted on one side of said rollers for adjusting the distance between said axes and means mounted on the other side of said rollers for holding same in adjusted position.

10. In welding apparatus, in combination, a pair of grooved rollers adapted to embrace and hold a cylindrical tube throughout a large part of the periphery of said tube, each of said rollers being of composite construction, peripheral parts of said two rollers, adjacent to the welding region, being of conducting material, the remainder of the peripheral parts of said rollers being of non-conducting material.

11. In welding apparatus, in combination, a pair of circumferentially grooved rollers, each of said rollers comprising a metallic part, said metal parts having peripheral presentations, the presentations on one side of each of said metallic parts being more closely spaced than on the other sides thereof, said rollers being provided with non-conducting peripheral parts shaped to embrace and hold the member to be welded.

12. In welding apparatus, in combination, a transformer, a pair of leads from said transformer, a pair of bearing members each connected to one of said leads, a support of conducting material slidably mounted upon each of said bearing members, said bearing members constituting electrical conducting means between said bearing members and said supports, said supports being slidably mounted upon their corresponding bearing members, a welding roller rotatably carried by each of said supports and conducting members for conducting current from each of said supports to its corresponding roller, said conducting members being mounted in slidable contacting relation with said supports and resiliently urged in a direction parallel with the axis of the corresponding roller into contact with said roller, whereby to provide a low resistance path from said support to said roller.

Signed at Chicago, Illinois, this 28th day of September, 1921.

NELS P. SJOBRING.
MARTIN SWANSON.